United States Patent [19]

Murray et al.

[11] 4,285,862

[45] Aug. 25, 1981

[54] PROTEIN ISOLATE PRODUCT

[75] Inventors: E. Donald Murray, Winnipeg; Chester D. Myers, Ajax; Larry D. Barker, Cobourg, all of Canada

[73] Assignee: General Foods, Limited, Toronto, Canada

[21] Appl. No.: 81,484

[22] Filed: Oct. 3, 1979

Related U.S. Application Data

[63] Continuation-in-part of Ser. No. 972,202, Dec. 22, 1978, abandoned, which is a continuation of Ser. No. 832,036, Sep. 12, 1977, Pat. No. 4,169,090.

[51] Int. Cl.$^3$ ............................ A23J 1/12; A23J 1/14
[52] U.S. Cl. ............................ 260/123.5; 260/112 R; 260/112 G; 426/656; 426/657
[58] Field of Search ............ 260/112 R, 123.5, 112 G; 426/656, 657

[56] References Cited

U.S. PATENT DOCUMENTS

| | | | |
|---|---|---|---|
| 3,995,070 | 11/1976 | Nagasawa et al. | 426/657 X |
| 4,169,090 | 9/1979 | Murray et al. | 260/112 R |
| 4,208,323 | 6/1980 | Murray et al. | 260/112 R |

OTHER PUBLICATIONS

Chem. Abstracts, vol. 79, 1973, 122809x, Slattery et al.
Chem. Abstracts, vol. 61, 1964, 2395d–2395e, Nakai.
Chem. Abstracts, vol. 82, 1975, 2802e, Schmidt et al.
Chem. Abstracts, vol. 86, 1977, 28558n, Stephen et al.
The Hydrophobic Effect, Tanford. Wiley–Interscience, N. Y. 1973, pp. 133–142 & 170–172.
Proc. Nat. Acad. Sci. U.S.A. vol. 75, pp. 5306–5310, Nov., 1978, Simons et al.
Bicohemistry. Lettninger, 1972, pp. 259–260.
Virology, 62, 90–101 (1974), Shimizu et al.
J. Biological Chem. vol. 251, No. 7, 1976, pp. 2113–2118, Calabro et al.
J. Biological Chem. vol. 247, No. 12, 1972, pp. 3848–3853, Nelson et al.
Proc. Nat. Acad. Sci. U.S.A. vol. 68, No. 5, pp. 1042–1046, 1971, Spatz et al.
Biochimica et Biophysica Acta, 436 (1976), 895–899, Helenius et al.

*Primary Examiner*—Howard E. Schain
*Attorney, Agent, or Firm*—Sim & McBurney

[57] ABSTRACT

A novel protein isolate is described. The isolate is substantially undenatured, has substantially no lysinoaniline content and substantially the same lysine content as the protein source material from which it is derived. The isolate has substantially no lipid content and takes the form of an amorphous, viscous, sticky, gluten-like protein mass, or a dried form of the mass. The amorphous protein mass is formed by settling an aqueous dispersion of protein micelles consisting of homogeneous amphiphilic protein moieties. The aqueous dispersion is formed from the source protein, usually a plant protein, preferably by a salting-in and dilution-out procedure. The protein isolate exhibits high functionality and may be used as an egg white or wheat gluten substitute in a variety of food products.

11 Claims, No Drawings

PROTEIN ISOLATE PRODUCT

REFERENCE TO RELATED APPLICATIONS

This application is a continuation-in-part of copending application Ser. No. 972,202 filed Dec. 22, 1978, (now abandoned), which in turn is a continuation of application Ser. No. 832,036 filed Sept. 12, 1977 (now U.S. Pat. No. 4,169,090).

FIELD OF INVENTION

The present application relates to novel protein isolate products and more particularly to novel protein isolate products which have wide functionality.

BACKGROUND TO THE INVENTION

Protein isolate products have protein contents (determined as Kjeldahl nitrogen×6.25) of at least 90%. Those protein isolates which are separated commercially from plant protein materials, such as, soybean, are usually substantially denatured and have little or no functionality.

Some naturally-occurring proteins, such as, egg white and wheat gluten, exhibit functionality, that is, they become involved in the overall molecular architecture of the product in which they are present, as well as nutritional benefits. The proteins are more desirable than the nonfunctional isolates and as a result command much higher prices. As far as we are aware, substantially undenatured functional protein isolates from plant protein sources have not been formed.

SUMMARY OF INVENTION

In accordance with the present invention, there is provided a novel protein isolate product which exhibits functionality. The novel protein isolate product may be derived from a variety of protein source materials, usually plant proteins, including starchy cereals, such as, wheat, corn, oats, rye, barley and triticale; starchy legumes, such as, field peas, chick peas, fababeans, navy beans and pinto beans; and oil seeds, such as, sunflower seeds, peanuts, rapeseed, and soybeans.

The novel protein isolate product has certain essential physical and chemical characteristics, namely:

(a) it is substantially undenatured, (b) it takes the form of an amorphous protein mass which is formed by settling the solid phase from an aqueous dispersion of protein micelles consisting of homogeneous amphiphilic protein moieties and formed from the protein source material, or a dried form of the mass, and (c) it exhibits substantially no lipid content, substantially no lysinoalanine content and substantially the same lysine content as the storage protein in the source material. The term "substantially no" as used herein to describe the lipid and lysinoalanine contents of the protein product is intended to indicate that the product may contain small amounts of one or the other of the materials but not more than about 1% of weight of the protein.

GENERAL DESCRIPTION OF INVENTION

The procedure which is conventionally used for the preparation of protein isolate products from plant source materials involves an isoelectric precipitation technique in which protein is solubilized in alkaline solution and the alkaline extract is acidified to the isoelectric point of the protein to cause precipitation of the protein isolate. The use of the relatively harsh processing conditions of this procedure is dictated by considerations of efficiency of recovery of protein from the source material. This procedure has been used commercially for processing soybeans.

The protein isolate which results from the latter procedure usually is substantially denatured (as determined by differential scanning calorimetry), impairing its nutritional value, and has little or no functional characteristics impairing its utility. The protein isolate product of this invention suffers from neither drawback, being substantially undenatured (as determined by differential scanning calorimetry) and possessing high functionality.

Another problem associated with the prior art soybean protein isolates is that the presence of lysinoalanine (LAL) in the isolate and a decrease in the lysine content of the protein (as compared to the storage protein in the source material) have been observed. The LAL poses a possible health hazard mainly due to a nephrotoxic effect, and hence is undesirable, and the decreased lysine content upsets the amino acid balance of the protein, resulting in a decreased nutritional value for the protein. The protein isolate product of this invention suffers from neither drawback, in that it contains substantially no lysinoalanine and exhibits substantially the same lysine content as the storage protein in the source material.

The novel protein isolate of this invention takes the form of an amorphous protein mass, which is viscous, sticky and gluten-like and which may be dried. This protein mass is formed by settling the solid phase from an aqueous dispersion of protein micelles consisting of homogeneous amphiphilic protein moieties and formed from the protein source material.

The term "micelle" is used herein in its classic scientific sense, as set forth by C. Tanford in "The Hydrophobic Effect", Wiley-Interscience, New York, 1973, p. 36:

"When amphiphilic molecules are dissolved in water, they can achieve segregation of their hydrophobic portions from the solvent by self-aggregation. The aggregated products are known as micelles". In addition, on page 63 of that book, it is stated:

". . . micelle formation requires the existence of two opposing forces, the hydrophobic force favouring aggregation and a repulsive force that prevents growth of the aggregates to large size . . . "

As described in more detail below, the dispersion of protein micelles is formed by ionic strength manipulations of aqueous solutions. Proteins are well known to be amphiphilic and in an aqueous environment, neither hydrogen bonds nor ionic attractions between protein molecules are present, leaving electrostatic and hydrophobic interactions as the controlling forces. One protein species only is required to form the protein micelles, although more than one species may be used. Further, the procedure is reversible upon reversal of the aqueous phase conditions.

The protein micelles which are formed in the production of the isolate of the invention consisting of homogeneous amphiphilic protein moieties, contrast markedly with the so-called "casein micelle". Although the latter term is commonly used in the food art to refer to dispersed casein protein particles, such as occur in cow's milk, the term is scientifically incorrect.

The "casein micelle" is known to be formed by the self-assembly of three major subunits and hence is a heterogeneous species, in contrast to the homogeneous nature of the protein moieties in the micellar precursor of the isolate of this invention. The term "homogeneous" as applied to the protein moieties of the micelle is used to indicate that the micelles are formed of pure protein although the protein itself may be heterogeneous and consist of more than one protein species. Only a single protein species is required to form the micelles in this invention, whereas multiple species are required for the "casein micelle".

The "casein micelle" is known to exist chemically in the form of a calcium phosphate complex and that micellar integrity is maintained, in part, by hydrogen bonding between the subunits of the micelle. In contrast, an ionic species is not required in the formation of the micelles in this invention which consist of homogeneous amphiphilic protein moieties and hydrogen bonding between subunits is not involved, although there is hydrogen bonding in the protein subunits themselves assisting in maintaining the three-dimensional structure of the protein micelle.

The protein isolate product of this invention is an amorphous mass formed by settling of the protein micelles. As the micelles settle, they coalesce to form the amorphous mass, that is, individual micelles no longer are detectable, but rather a coherent mass of protein is formed. The latter mass is termed "protein micellar mass" or "PPM".

The amorphous nature of the settled mass contrasts with the precipitated form of the "casein micelle" in which the individual particles are retained, and hence the precipitate is not amorphous. This difference results from the different physical and chemical nature of the "casein micelle" when compared with the protein micelles of this invention.

Lipids are known to form true "micelles", in the classic scientific sense. Lipids are chemically different from proteins, although both are amphiphilic species. Proteins are composed of amino acids and have a backbone structure of repeating units while lipids have no such structure. One of the characteristics of the novel isolate of the invention is that it is substantially lipid-free.

Individual lipid molecules are composed of a polar head and non-polar tail and the micelle which is formed is composed of a uniform orientation of polar heads exposed to the aqueous medium and non-polar tails associating with each other so as to minimize exposure to the aqueous medium. In contrast, the protein micelles have a predominantly polar surface with non-polar areas, resulting from the complicated three-dimensional structure of the protein molecule.

This difference limits the growth potential of lipid micelles and dispersions of lipid micelles usually appear to be clear solutions. The non-polar surface areas of the protein micelles permit the micelles to grow and form a visible cloud which precipitates from the aqueous suspension. The non-polar surface areas of the protein micelle results in inner polar areas, so that water tends to occlude inside the protein micelle to a greater extent than in the lipid micelle.

The amorphous protein mass is a viscous, sticky, gelatinous, gluten-like material and has aqueous phase occluded therewith for the reasons noted above. The mass may have a moisture content in the range of about 50 to about 95% by weight, depending on the settling procedure adopted and as discussed in more detail below. The protein mass may be used in the wet form or may be dried by any convenient technique which does not substantially denature the protein, such as, spray drying, freeze drying or vacuum drum drying, for use in that form.

The protein isolate product of this invention, whether in wet or dry form, is a true protein isolate i.e., having a protein content in excess of 90% by weight (calculated as Kjeldahl $N \times 6.25$) on a dry basis and usually in excess of about 95% by weight.

The protein isolate product may be used in conventional applications of protein isolates, such as, protein fortification of processed foods, emulsification of oils, body formers in baked goods and foaming agents in products which entrap gases.

The protein isolate product, however, also has functionality not exhibited by the source material and isoelectric precipitates thereof. Thus, the isolate product may be formed into protein fibres, useful in meat analogs, may be used as an egg white substitute or extender in food products where egg white is used as a binder or as a wheat gluten substitute or extender in wheat-based products.

The protein isolate product is described herein as "gluten-like". This description is intended to indicate that the appearance and feel of the isolate are similar to those of gluten and is not intended to indicate chemical identity to gluten.

Gluten is isolated from wheat flour or the like by a simple washing procedure whereby starch and other soluble materials are removed. Gluten, in dry form is not a protein isolate in that it contains only about 75 to 85% protein, whereas the minimum protein requirement for an "isolate" is 90%. Additionally, gluten contains 5 to 10% by weight lipids, which are essential for good dough-forming properties, whereas the protein isolate product of this invention is substantially lipid-free, and yet is useful as a wheat gluten substituted or extender.

Gluten may be purified to provide an isolate by removal of non-protein material but generally this is not practised since both protein and non-protein material are considered to contribute to good bread-making qualities. The gluten protein resulting from the purification is heterogeneous, consisting of about equal parts of alcohol-soluble gliadin and alcohol-insoluble glutenin. Both gliadin and glutenin have a marked insolubility in salt solutions and some agents which can bring about molecular structure degradation often is required to effect solubilization. Neither protein exists as a discrete entity identified as a single molecular weight, gliadin having a molecular weight distribution from about 10,000 to 100,000 and glutenin ranges from about 150,000 to 3 million.

While wheat is included as a source material for the protein isolate product of this invention, it is the globulin fraction of the wheat which responds to the salt solubilization procedure described below in view of the insolubility of the gluten fraction.

The protein isolate product of this invention is distinguished from gluten and from the protein components thereof, in that the product of this invention is an "isolate" by virtue of its protein content whereas gluten is not an isolate, and the protein isolate has discrete identifiable molecular identities and is soluble in aqueous salt solutions whereas the protein moieties of gluten do not exhibit such properties.

The dispersion of protein micelles which settle to form the protein isolate product of this invention may be formed from the protein source material by a salting-in and dilution-out technique. While the following description of procedures for formation of the protein micelle dispersion represent the only ones currently-known to the applicants, the invention is not limited thereto but includes protein isolate products having the physical and chemical characteristics recited above and formed by other procedures.

One procedure involves subjecting a protein source material to an aqueous food grade salt solution having a salt concentration of at least about 0.2 ionic strength at a temperature of about 15° to about 35° C. and a pH of about 5.5 to about 6.3 to form a protein solution, and diluting the resulting protein solution to an ionic strength of less than about 0.1 to cause formation of the protein micelles in the aqueous phase.

The pH range of 5.5 to 6.3 is selected for this procedure since the micellar form of the isolate is not obtained in any significant amounts at pH values above 6.3, protein yields fall significantly at higher values and, while the micellar form of the isolate is obtained at pH values below 5.5 down to about 5.0, phosphorus contamination occurs to an unacceptable degree at pH values below 5.5.

As outlined in copending U.S. application Ser. No. 22,229 filed Mar. 20, 1979, now U.S. Pat. No. 4,208,323, issued 6/17/80 assigned to the assignee of this application, the disclosure of which is incorporated herein by reference, the yield of protein isolate which may be obtained by the above-mentioned procedure is improved by increasing the protein concentration of the protein solution obtained in the extraction step, while the salt concentration remains the same. This concentration also enables the protein isolation process to be effected over wider ranges of some of the parameters.

Another procedure for forming the protein micelle dispersion, therefore, involves extracting the protein source material with an aqueous food grade salt solution having an ionic strength of at least about 0.2 and a pH of about 5 to about 6.8, at a temperature of about 15° to about 35° C. to cause solubilization of protein material in the protein source material and form a protein solution, increasing the protein concentration of the protein solution while maintaining the ionic strength substantially constant, and diluting the concentrated protein solution to an ionic strength below about 0.2 to cause formation of protein micelles in the aqueous phase.

In the above procedures, the protein source material usually is comminuted by any convenient technique prior to effecting the protein extraction thereon. The average particle size of the comminuted material may vary widely, generally between about 10 and about 800 mesh, preferably less than about 200 mesh. The comminution may be accompanied by physical removal of some non-proteinaceous material by conventional techniques.

A food grade salt solution is used in the protein solubilization, and the food grade salt usually is sodium chloride, although other salts, such as, potassium chloride or calcium chloride, may be used. The food grade salt solution has an ionic strength of at least about 0.2 to enable solubilization of significant quantities of protein to be effected. As the ionic strength of the salt solution increases, the degree of solubilization of protein in the source material initially increases until a maximum value is achieved. Any subsequent increase in ionic strength does not increase the protein solubilization. The ionic strength of the food grade salt solution which causes maximum protein solubilization varies depending on the salt concerned and the protein source chosen.

In view of the greater degree of dilution required with increasing ionic strengths, it is usually preferred to utilize an ionic strength value less than about 0.8, and more preferably a value of about 0.3 to about 0.6. Ionic strength values up to 5.0, however, have been used.

The salt solubilization of the protein is effected at a temperature of about 15° to about 35° C., preferably accompanied by agitation to decrease the solubilization time, which is usually about 10 to about 60 minutes. It is preferred to effect the solubilization to extract substantially the maximum amount of protein from the source material.

The lower temperature limit of about 15° C. is chosen since solubilization is impractically slow below this temperature while the upper temperature limit of about 35° C. is chosen since microbial growth becomes unacceptably rapid above this temperature.

In the case of the first-mentioned procedure, the aqueous food grade salt solution has a pH of 5.5 to 6.3 for the reasons outlined above. When the procedure of U.S. Ser. No. 22,229 is used, the aqueous food grade salt solution has a pH of about 5 to about 6.8. At and close to the limits of the latter pH range, protein isolate formation occurs only partly through the micelle route and in lower yields than attainable elsewhere in the pH range, and for these reasons, pH values of about 5.3 to 6.2 in the latter procedure are preferred.

The concentration of protein source material in the food grade salt solution during the solubilization step may vary widely. Typical concentration values are about 5 to about 15% w/v.

Once the protein extraction operation has been effected, the protein solution is separated from solid phase extracted protein material. The protein solution usually has a protein concentration of about 10 to about 100 g/l, preferably about 30 to about 70 g/l. In the case of the first-mentioned procedure, this protein solution next is diluted, as described in more detail above, while in the procedure of U.S. Ser. No. 22,229, the protein solution is concentrated to increase the protein concentration thereof while maintaining the ionic strength thereof substantially constant.

This concentration step may be effected by any convenient selective membrane technique, such as, ultrafiltration or diafiltration. The concentration step has the beneficial effect of increasing the yield of isolate which may be obtained from the process as compared with the first-mentioned procedure, and thereby increasing the overall efficiency of the protein isolation process.

The degree of concentration of the protein solution can be termed the "concentration factor" or more properly "volume reduction factor". As the volume reduction factor, expressed as the ratio of the volume of the solution prior to concentration to the volume of concentrated solution, and hence the protein concentration, increases from 1.0, the attainable yield increases until a maximum is reached.

Once the maximum attainable yield is reached, further decreases in volume of concentrated solution are beneficial only with respect to the volume of liquid required for subsequent dilution during the protein isolation step.

The volume reduction factor at which the maximum attainable yield is reached is dependent on the protein source material concerned and the pH of the protein solution. It is preferred to use a volume reduction factor of 3.0 to 4.0, since the maximum attainable yield frequently results from the use of these values. A volume reduction factor of at least 1.1 usually is used and as the volume reduction factors become quite high, usually about 5.0 to 6.0, the viscosity of the protein solution becomes quite high, which may lead to difficulties in later processing, thereby inhibiting the utilization of greater values.

The concentration may be effected at any convenient temperature, typically about 20° to about 50° C., and for the period of time to effect the desired degree of concentration. The temperature and other conditions used to some degree depend upon the membrane equipment used to effect the concentration.

The concentrating of the protein solution in this step not only increases the overall process yield as compared with the first-mentioned procedure but also decreases the salt concentration of the protein isolate after drying. The ability to control the salt concentration of the isolate is important in applications of the isolate where variations in salt concentrations affect the properties.

The concentration step enables the upper limit of pH of the extraction step to be increased to about 6.8 from the about 6.3 value of the first-mentioned procedure, although such higher values are less preferred, for the reasons discussed above.

As mentioned previously, one of the difficulties of the first-mentioned procedure in using pH values from 5.0 to 5.5 is the phosphorus content of the isolate, mainly in the form of phytic acid. As the quantity of phytic acid in the isolate increases, the digestibility of the isolate is increasingly adversely affected. It is preferred, therefore, to decrease the phosphorus content of the isolate to the greatest extent possible.

As set forth in U.S. Ser. No. 22,229, while the concentration of the protein solution does not affect the phosphorus content of the final protein isolate attainable to any significant degree, when the concentration step is combined with at least one "washing" step, then the phosphorus content of the isolate obtained in the pH range of about 5 to 5.5 is significantly decreased, enabling the isolation process to be used over a broader pH range than used in the first-mentioned procedure.

The "washing" step may be effected by first concentrating the protein solution, diluting the concentrated protein solution with food grade salt solution while maintaining the protein in a dispersed state, and subsequently reconcentrating the diluted protein solution to increase the protein concentration thereof while maintaining the ionic strength substantially constant. The dilution and reconcentration operations may be repeated, if desired, until the maximum decrease in phosphorus concentration is attained, if the latter has not been achieved in the initial "washing" step.

The dilution of the concentrated protein solution while maintaining the protein in a dispersed state is usually effected to provide substantially the same protein concentration in the diluted solution as prior to the concentration step, usually by using the same volume of salt solution as removed in the concentration step and having the same ionic strength as the concentrated solution, so that the dilution is effected with substantially no change in ionic strength.

The reconcentration of the diluted protein solution is usually effected by the same volume reduction factor as the initial concentration step, with the ionic strength remaining substantially constant, although a different volume reduction factor may be used, if desired.

The "washing" operation may also be effected in an alternative manner by continuously feeding food grade salt solution into the protein solution resulting from the extraction step while the latter is subjected to concentration by a membrane technique to remove salt solution at the same rate.

In the latter procedure, the volume of protein solution and the ionic strength thereof remain the same during the addition of food grade salt solution until the "washing" has achieved the desired degree of phosphorus removal. The addition of fresh food grade salt solution then is terminated and the washed protein solution concentrated to the desired degree for further processing.

The combination of the washing and concentration steps significantly decreases the phosphorus concentration of the isolate over the 5.0 to 5.5 pH range, providing practicality to the utilization of those pH values for protein extraction.

When either of the above-mentioned procedures is used, a decrease in phosphorus content as compared to the initial protein source material results. The phosphorus concentration decreases by about 20 to 30% by weight of that in the source material in the pH range of 5.0 to 5.5 without the "washing" step and decreases of about 40 to 50% are attained above pH 5.5. The at least one "washing" step in the procedure of U.S. Ser. No. 22,229 permits similar phosphorus level decreases to those attained at above pH 5.5 to be attained, usually to a value less than about 0.8 wt % and preferably less than 0.5 wt %.

The concentrated protein solution resulting from the concentration step or combined concentration and washing steps, whichever procedure is adopted generally has a protein concentration of about 40 to about 200 g/l, depending on the initial protein concentration and the volume reduction factor used. This solution is diluted to an ionic strength of less than about 0.2, generally by passing the concentrated protein solution into a body of water having the volume required to achieve the ionic strength decrease.

In the case of the first-mentioned procedure, the protein solution is diluted to an ionic strength of less than about 0.1, usually by the same technique, namely, feeding the solution into a body of water.

The body of water into which the protein solution or concentrated protein solution is fed usually has a temperature less than about 25° C. and preferably has a temperature of about 5° to about 15° C., since improved yields of protein isolate are attained with these colder temperatures.

The decrease in ionic strength of the protein solution or concentrated protein solution causes the formation of a cloud-like mass of discrete protein droplets in micellar form, which is the dispersion of protein micelles consisting of homogeneous amphiphilic protein moieties from which the product of the invention is formed by settling.

The settling of the micelles may be induced, such as by centrifugation. Such induced settling decreases the liquid content of the protein isolate mass, thereby decreasing the moisture content generally from about 70% by weight to about 95% by weight to a value of generally about 50% by weight to about 80% by weight. Decreasing the moisture content of the isolate mass in this way also decreases the occluded salt content of the isolate, and hence the salt content of dried isolate.

The ionic strength to which the concentrated protein solution is diluted below about 0.2 affects the efficiency of micellization and hence the yield of isolate which is attained. For this reason, the ionic strength usually is decreased to a value less than about 0.15 and preferably less than about 0.1. The ability to attain good yields of protein isolate in the ionic strength range of about 0.1 to about 0.2 in the procedure of U.S. Ser. No. 22,229 contrasts markedly with the first-mentioned procedure where the ionic strength must be decreased below 0.1 to achieve reasonable yields.

The dilution of the concentrated protein solution is preferably effected to an ionic strength in the range of about 0.06 to about 0.12, since optimum yields are attainable in this range, and excessive volumes of water for no additional benefit are required for an ionic strength below about 0.06. The lower limit of ionic strength for the diluted protein solution is dictated more by practical economic considerations of liquor volume than by process operability considerations.

The above-described procedures for attaining the protein micelle dispersion share the merits of mild processing to achieve the undenatured protein isolate product of high functionality provided in accordance with this invention. The procedure of U.S. Ser. No. 22,229 improves upon the first-mentioned procedure in increasing the protein isolate yield and enabling phosphorus levels to be controlled sufficiently to expand the usable pH range. The yield can be optimized for any particular source material by selection of appropriate conditions in accordance with the above detailed discussion of each of the steps of the two procedures.

EXAMPLES

EXAMPLE I

This Example illustrates the formation of the novel protein isolate of this invention.

Fababeans (*Vicia faba* L. var. *minora*) were pin milled to a fine particle size and air classified to produce a concentrate of 53% by weight protein (as determined by Kjeldahl N×5.85). The dry concentrate was mixed with an 0.3 M sodium chloride solution (ionic strength 0.3) at a concentration of 10% w/v and the mixture was stirred for 30 minutes with no pH adjustments being necessary to hold the extract at a pH of 5.9±0.2. The resulting mixture was then processed to remove cellular debris and starch granules by centrifugation using a continuous, desludging unit. The resulting aqueous protein extract contained greater than 80% of the protein in the concentrate and had a concentration of 45 mg/ml.

The aqueous protein extract was diluted into a cold tap water (10° C.) in a ratio of 1 part by volume of extract to 3 parts by volume of water. Immediately upon dilution, a white cloud formed in the aqueous phase. A microscopic check of the cloud showed the presence of many small spheres which bound a protein specific stain and consisted of homogeneous amphiphilic protein moieties.

The dilution system was allowed to stand unagitated for about 30 minutes while the protein micelles settled therefrom. The supernatant then was decanted and an amorphous viscous sticky gelatinous protein mass was found in the bottom of the vessel. The protein mass was spray dried at an outlet temperature of 100° C. and the dried material was analyzed for chemical content using standard A.O.A.C. tests. The analysis is reproduced in the following Table I:

TABLE I

| Constituent | Concentrate | Isolate |
|---|---|---|
| | % by weight | |
| Protein (KN × 5.85)[2] | 52.9 | 95.57 |
| Fiber | 1.0 | N.D.[1] |
| Lipid | 2.1 | N.D.[1] |
| Ash | 8.6 | 2.81 |
| Phosphorus | 0.69 | 0.37 |
| Other and experimental error | 34.71 | 1.25 |

[1]N.D. as used here and in later Tables means not detected
[2]The lower than normal Kjeldahl nitrogen conversion factor (5.85 vs 6.25) used to determine the protein contents is appropriate for this particular plant source.

It will be seen from the results of the above Table I that the isolate is highly proteinaceous, substantially lipid free and that the overall phosphorus level decreased by about 46% in the processing. The phosphorus thus is not bound as extensively to the novel isolate as it is to the conventional soy isolate, where phosphorus precipitates with the isoelectric protein.

Amino acid analyses were also effected on the concentrate and dried isolate (essentially following the procedure described by D. H. Spackman in "Methods in Enzymology, Vol. II, 1967) and the results are reproduced in the following Table II:

TABLE II

| Amino Acid | Concentrate | Isolate |
|---|---|---|
| | (moles/$10^5$ g of protein) | |
| Lysine | 37 | 35 |
| Cystine | 6 | 6 |
| Methionine | 4 | 4 |
| Tryptophan | 4 | 4 |
| Histidine | 18 | 19 |
| Lysinoalanine (LAL) | N.D. | N.D. |

It will be seen from the results of Table II that there was no significant decrease in lysine content of the protein material and no LAL was detected in the starting material or isolate.

Differential scanning calorimetry tests on the dried isolate material showed the isolate to be substantially undenatured.

EXAMPLE II

The procedure of Example I was repeated using a fababean flour of 29.1% protein at a concentration of 25% w/v in the salt solution to yield an extract containing 47.0 mg/ml of protein. Upon dilution, similar results were obtained to those outlined in Example I.

EXAMPLE III

This Example illustrates the formation of the protein isolate from field peas following generally the procedure of Example I.

Dried field peas were cleaned, milled and air classified to yield a starting protein concentrate of 52.6% (N×5.85). The concentrate was added to a 0.4 Molar sodium chloride solution (pH 6.1) at a 10% w/v concentration and stirred for 30 minutes at 25° C. A protein extract was separated from unsolubilized material by centrifugation and then diluted into cold tap water (10° C.) at a ratio of 1 volume of extract to 5 volumes of water. A cloud of protein micelles formed which were collected and spraydried at 100° C. outlet temperatures.

Chemical analysis was effected on the dried isolate using standard A.O.A.C. tests and the results are reproduced in the following Table III:

TABLE III

| Constituent | Concentrate | Isolate |
|---|---|---|
| Protein (Kjeldahl N × 5.85) | 52.6% | 95.5% |
| Fiber | 1.95 | N.D. |
| Lipid | 2.45 | N.D. |
| Ash | 4.99 | 2.47 |
| Phosphorus | 0.81 | 0.29 |
| Other and Experimental Error | 37.20 | 1.74 |

As seen in the results of Table III, the isolate obtained was highly proteinaceous, and exhibited no lipid content and a decreased phosphorus concentration.

Amino acid analyses were also effected and these results appear in the following Table IV:

TABLE IV

| | Concentrate | Isolate |
|---|---|---|
| Amino Acid | (Moles/$10^5$ g of protein) | |
| Lysine | 47 | 48 |
| Cystine | 5 | 5 |
| Methionine | 5 | 4 |
| Tryptophan | 3 | 3 |
| Histidine | 20 | 21 |
| Lysinoalanine | N.D. | N.D. |

The results of Table IV show no decrease in lysine content resulting from the process and an absence of lysinoalanine from both the starting material and the isolate product.

EXAMPLES IV TO XIII

These Examples illustrate the formation of the novel isolate from a variety of plant material sources using the general procedure of Example I.

A number of different plant materials were processed following the general procedure outlined in Example I. In each case, protein micelles were formed upon dilution of the aqueous extract, an amorphous protein isolate mass was collected in each case and a dry protein isolate formed therefrom. In each case, analysis of the product confirmed a protein content in excess of 90 wt % and other results similar to those outlined in Examples I and III.

The plant materials and conditions of the procedure are outlined in the following Table V:

TABLE V

| Example No. | Plant Source | Protein Content (N × 6.25 wt %) | Salt Conc. M (NaCl unless noted) | Aq. phase Conc. % w/v | Temp. °C. | Time Min. | pH | Protein Content of extract mg/ml | Dilution Factor (Extract: Water) | Notes |
|---|---|---|---|---|---|---|---|---|---|---|
| IV | Navy Beans | 23.3 | 0.4 | 10 | 37 | 30 | | 26.3 | 1:3 | |
| V | Chick Peas | | 0.5 | | | | | 21.5 | 1:4 | |
| VI | Fababean | | 0.4 (KCl) | 10 | 25 | | 5.80 | 49.66 | 1:5 | Collected by Centrifugation at 3000xg |
| VII | Fababean | | 0.5 (NaH$_2$PO$_4$) | | | | | | | |
| VIII | Rapeseed | 35 | 0.5 | 10 | 37 | 30 | 5.8 | 16.6 | 1:10 | |
| IX | Sunflower | 42 | 0.4 | 10 | 37 | | 6.1 | 19.2 | 1:10 | 96.2% protein in product (N × 5.85) |
| X | Soybean | 45.49 | 0.4 | 15 | 25 | 30 | 6.0 | 19.0 | 1:4 | 90.0% protein in product (N × 5.85) |
| XI | Oats | 17.8 | 0.5 (CaCl$_2$) | 20 | 37 | 30 | 6.3 | 25.4 | * | 90.3% protein in product (N × 5.83) |
| XII | Barley | 26.35 | 0.5 (CaCl$_2$) | 20 | 35 | 30 | 6.2 | | * | |
| XIII | Rye | | | | | | | | * | microscopic examination only for micelle formation |

* ionic strength decreased by dialysis

EXAMPLE XIV

This Example illustrates the yield of protein isolate attainable at various pH values following generally the procedure of Example I.

In a series of experiments at differing pH values, fababean concentrate (having a phosphorus content in the protein of 1.05 wt. %) was extracted with aqueous sodium chloride solution at an ionic strength value of about 0.35 and at 35° C. and subsequently diluted the protein solution to an ionic strength value of about 0.1 following the procedure outlined in Example I. The yield of isolate obtained was determined in each instance and the results are reproduced in the following Table VI:

TABLE VI

| pH | Yield (% recovery) |
|---|---|
| 4.7 | 20 |
| 5.1 | 60 |
| 5.8 | 70 |
| 6.1 | 60 |
| 6.5 | 30 |
| 6.9 | 15 |
| 7.1 | 5 |
| 7.6 | 5 |

The results of the above Table VI show that percentage yield increases rapidly with increasing pH value and also rapidly drops off once a maximum is reached, around pH 5.9 for this protein source material. The yields attained within the pH range of 5.5 to 6.3 (greater than about 55% and up to about 70%) compare favourably with isoelectric precipitation procedures for soybean isolates where yields of about 60% are typical.

Samples of the isolate obtained were analyzed for phosphorus content as a measure of the phytic acid content of the isolate and the percentage change from the starting concentrate was determined for each sample. The following Table VII summarizes the results attained:

TABLE VII

| pH | P wt. % | change wt. % |
|---|---|---|
| 4.7 | 0.89 | −15.2 |
| 5.1 | 0.83 | −20.9 |
| 5.3 | 0.89 | −14.8 |
| 5.8 | 0.60 | −42.9 |
| 6.1 | 0.59 | −43.0 |
| 6.5 | 0.56 | −46.5 |

The results of Table VII show that a pH value of 5.5 or above is required to effect a substantial decrease in the phosphorus level i.e., greater than 35%. Table I in Example I also shows an about 46% decrease in phosphorus level and Table III in Example III shows a decrease of about 64%.

The decreases in phosphorus level observed compare favourably with the about 20% increase in phosphorus concentration observed when an isoelectric precipitate is formed from the same fababean concentrate, by initial extraction at pH 9.5 and acidification to pH 4.5 to cause precipitation.

EXAMPLE XV

This Example illustrates the form of isolate obtained over a wide range of pH values.

The procedure of Example XIV was repeated on fababean concentrate using an aqueous sodium chloride solution at an ionic strength of 0.5° at 25° C. In each instance, the protein dispersion formed on dilution to ionic strength below 0.1 was observed by light microscopy to determine the form of the particles. The results are reproduced in the following Table VIII:

TABLE VIII

| pH value | Form of Protein Particles in Dispersion |
|---|---|
| 4.8 | very few (less than 10%) micelles, mostly particulate |
| 5.0 | coagulation with some (about 10 to 20%) very small micelles |
| 5.2 | lots (greater than 80%) of good micelles |
| 5.3 | lots (greater than 80%) of good micelles |
| 5.4 | lots (greater than 80%) of good micelles |
| 6.0 | completely (100%) micellar |
| 6.2 | very good micelles amounting to about 50% of precipitate |
| 6.3 | very good micelles amounting to about 50% of precipitate |
| 6.4 | some micelles but less than 15% of precipitate |
| 6.5 | some (10 to 20%) very small micelles |
| 6.7 | only a few (less than 10%) very small micelles |
| 6.8 | no detectable micelles |

The micelles present at pH 5.0 and below and above pH 6.3 were few in number, only detectable with difficulty. The results of the above Table VIII illustrate that the micellar form of the protein dispersion is only attained over a limited pH range (5.2 to 6.3). However, the phosphorus levels observed for the isolates obtained at pH values below 5.5 (see Table VII) preclude the use of those pH values in the protein isolate forming procedure.

EXAMPLE XVI

This Example illustrates the formation of the novel isolate by the procedure of U.S. Ser. No. 22,229.

A protein concentrate (about 50 wt % protein) of field peas was mixed with an 0.4 molar sodium chloride solution at a 10% w/v level at a temperature of about 25° C. The mixture was stirred for about 25 minutes at a pH of about 6.0. The aqueous protein extract was separated from residual solid matter and had a protein concentration of about 40 mg/ml.

The extract then was concentrated on an ultrafiltration unit using two "ROMICON" (Trademark) type XM50 cartridges over a processing period of about 40 minutes at a temperature of about 45° C. The "ROMICON" ultrafiltration cartridge is manufactured by Rohm and Haas Company, the designation "50" referring to a molecular weight cut-off of 50,000. Concentrations at various volume reduction factors (i.e., the ratio of initial volume to that of concentrated solution) in the range of 3.0 to 5.0 were prepared and these concentrates had a pH of about 6.0 to 6.3.

The concentrates were each diluted into cold water having a temperature of about 8° C. at a volume ratio of 1 to 5 (i.e., 1 part of concentrate to 5 parts of water) i.e., to an ionic strength of about 0.07. Immediately upon dilution, a white cloud of protein isolate, observed to be in the form of protein micelles consisting of homogeneous amphiphilic protein moieties, formed in the dilution system. The protein micelles were allowed to settle as a highly viscous amorphous gelatinous precipitate in the bottom of the vessel.

The wet PMM recovered from the supernatant liquid was spray dried to provide a dry powder product. Overall protein yields of about 35 to 40% were obtained, based on the initial protein over the tested volume reduction factor range, as compared with a yield of about 20% for the equivalent process for this concentrate but omitting the concentration step.

EXAMPLE XVII

The procedure of Example XVI was repeated on a different sample of field peas from another crop. The PMM powder produced was analyzed and the results compared with those for the starting material. The analyses are reproduced in the following Tables IX and X:

TABLE IX

| Constituent | Concentrate | PMM |
|---|---|---|
|  | % by weight | |
| Protein (N × 6.25) | 53.5 | 92.1 |

TABLE IX-continued

| Constituent | Concentrate | PMM |
|---|---|---|
| | % by weight | |
| Fibre | 0.2 | ND |
| Lipid | 1.8 | 0.7 |
| Ash | 4.5 | 4.2 |
| Phosphorus | 0.7 | 0.3 |
| Other and experimental error | 39.3 | 2.7 |

TABLE X

| Amino Acid | Concentrate | Isolate |
|---|---|---|
| | (moles/$10^5$ g of protein) | |
| Lysine | 49 | 49 |
| Cystine | 6 | 4 |
| Methionine | 7 | 5 |
| Tryptophan | 4 | 4 |
| Histidine | 15 | 14 |
| Alanine | 47 | 47 |
| Lysinoalanine | not determined | |

It will be seen from the results of the above Table IX that the isolate is highly proteinaceous, substantially lipid free and that the overall phosphorus level decreased by about 57% in the processing.

The amino acid analysis in Table X shows that there is no decrease in lysine or alanine content of the protein material. While the LAL content was not determined, the absence of any change in both lysine and alanine contents indicates that the product is free from LAL.

Differential scanning calorimetry tests on the dried PMM showed the isolate to be substantially undenatured.

EXAMPLE XVIII

This Example illustrates the effect of pH of extraction on overall process yield.

A series of experiments was effected generally following the procedure of Example XVI and the yield of protein isolate was determined in each instance.

In one group of experiments, fababean concentrate was extracted with 0.35 M sodium chloride solution at varying pH values from 4.6 to 7.0 for 45 minutes at 35° C.

After subjecting the protein solution to ultrafiltration to provide a volume reduction factor of 3.5, the concentrated protein solution was diluted 1 to 2.5 (to an ionic strength of 0.1) to form a cloud of protein particles. The form of the protein isolate in the cloud was observed microscopically. The protein isolate was settled by centrifugation, separated from supernatant liquid and spraydried to a powder.

In another group of experiments, the procedure of the first group was repeated except that the ultrafiltration step was omitted.

The results obtained are reproduced in the following Table XI:

TABLE XI

| pH | Overall Process Yield (%) With Ultra-filtration | Overall Process Yield (%) No Ultra-filtration | Form of Isolate (Ultrafiltration group only) |
|---|---|---|---|
| 4.6 | 22.0 | 19.7 | less than 10% micelles, mostly particulate |
| 4.8 | 29.5 | 23.6 | about 10 to 20% micelles, mostly particulate |
| 5.0 | 39.4 | 31.5 | about 40 to 50% small micelles |
| 5.2 | 62.0 | 47.2 | greater than 80% small micelles |
| 5.4 | 57.8 | 49.7 | greater than 80% small micelles |
| 5.6 | 67.0 | 53.2 | greater than 80% large and small micelles |
| 5.8 | 63.0 | 51.4 | greater than 80% large and small micelles |
| 6.0 | 59.4 | 49.7 | greater than 80% small micelles |
| 6.2 | 54.3 | 47.7 | greater than 80% small micelles |
| 6.4 | 54.2 | 42.1 | greater than 80% small micelles |
| 6.6 | 48.9 | 38.2 | about 40 to 50% small and large micelles |
| 6.8 | 42.7 | 30.7 | about 40 to 50% small and large micelles |
| 7.0 | 27.9 | 17.3 | less than 10% micelles |

The results of the above Table XI illustrate that improved yields are attained using ultrafiltration over a wide pH range. Protein micellar mass is attained over a restricted pH range only but the range is broader than if the ultrafiltration step is omitted, as may be seen by comparison with Table VIII.

EXAMPLE XIX

The procedure of Example XVII was repeated except that field peas were used in place of fababeans. Yield determinations were made on a spot basis only over the pH range from 4.5 to 7.0. The results are reproduced in the following Table XII:

TABLE XII

| pH | Overall Process Yield (%) With Ultra-filtration | Overall Process Yield (%) No Ultra-filtration | Form of Isolate |
|---|---|---|---|
| 5.0 | 34.2 | 24.9 | about 40 to 50% small micelles |
| 5.7 | 66.5 | 46.3 | greater than 80% small micelles |
| 6.0 | 69.7 | 43.2 | greater than 80% small micelles |
| 6.6 | 45.5 | 32.6 | greater than 80% small and medium micelles |
| 6.8 | 38.6 | 22.3 | greater than 80% small and medium micelles |
| 7.0 | 29.3 | 11.4 | no micelles |

The results of the above Table XII corroborate those of Table XI with respect to yield improvements and protein isolate form.

EXAMPLE XX

This Example illustrates the effect of concentration and combined effect of concentration and washing on phosphorus concentration of isolate.

The procedure of Example XVII was repeated except that varying pH values were used in the extraction step and, in one group of experiments, the concentrated protein solution was diluted with 0.35 M sodium chloride solution and again subjected to ultrafiltration to concentrate the diluted solution by a volume reduction factor of 3.5, while these steps were omitted from a second group of experiments. In each case, the phosphorus concentration in the dry isolate was determined and compared with that in the starting protein concentrate, which contained 0.82% phosphorus.

The results are produced in the following Table XIII:

TABLE XIII

| | | | | | with | |
|---|---|---|---|---|---|---|
| | No UF | | With UF | | UF + washing | |
| pH | % P | Change | %P | Change | %P | Change |
| | | (UF = Ultrafiltration) | | | | |
| 4.8 | 0.72 | −12.2 | 0.70 | −14.6 | 0.46 | −43.9 |
| 5.0 | 0.55 | −32.9 | 0.57 | −30.4 | 0.42 | −47.6 |
| 5.2 | 0.55 | −32.9 | 0.45 | −45.1 | 0.39 | −52.4 |
| 5.4 | 0.41 | −50.0 | 0.45 | −45.1 | 0.39 | −51.2 |

% Change in P content relative to starting material and absolute value

The results of Table XIII show that the ultrafiltration alone has little effect on phosphorus concentration but that washing along with ultrafiltration produces significantly improved phosphorus level decreases up to pH 5.4, and enables pH's from 5.0 to 5.5 to be satisfactorily used, as compared with the procedure where no ultrafiltration and washing are used. (see results above and Table VII).

EXAMPLE XXII

This Example illustrates the effect of volume reduction factor on yield.

The procedure of Example XVII was repeated on field peas at various volume reduction factors at pH values of 5.0 and 5.7. The yield of the dilution step was determined in each case. The following Table XIV reproduces the results:

TABLE XIV

| pH VRF[1] | 5.0 Dilution Yield % | 5.7 Dilution Yield % |
|---|---|---|
| 1.0 | 45.6 | 46.1 |
| 2.0 | 51.5 | 63.1 |
| 2.5 | 48.7 | 61.9 |
| 3.0 | 46.6 | 73.4 |
| 3.5 | 62.6 | 66.2 |
| 4.0 | 64.0 | 76.6 |
| 5.0 | 64.0 | 55.4[2] |
| 6.0 | 66.0 | 71.7 |

Note:
[1] VRF is volume reduction factor
[2] This result is anomalous

The results of the above Table XIV indicate that in increase in volume reduction factor leads to an increase in yield of the dilution step, up to a maximum yield level after which increases in volume reduction factor do not result in any significant yield improvement.

EXAMPLE XXII

This Example illustrates the effect of varying degrees of dilution on dilution step yield.

The procedure of Example XVIII was repeated using the same two groups of experiments outlined therein, except that instead of varying pH, a pH of 6.0 was used, and the protein solution was diluted to varying final ionic strength values. The dilution yield of protein isolate was determined in each case.

The results obtained are reproduced in the following Table XV:

TABLE XV

| Ionic Strength of Diluted Solution | Dilution Yield % | |
|---|---|---|
| | With U.F. | Without U.F. |
| 0.2 | 39.8 | 10.4 |
| 0.18 | 38.4 | 17.8 |
| 0.15 | 43.4 | 28.4 |
| 0.12 | 52.9 | 34.3 |
| 0.10 | 57.9 | 35.9 |
| 0.08 | 59.4 | 39.6 |
| 0.06 | 60.9 | 44.6 |

As can be seen from the results of the above Table XV, when ultrafiltration is used, the yield from the dilution step is quite high (of the order of 40%) at an ionic strength of 0.2 and increases as the degree of dilution increases. In the absence of ultrafiltration, low dilution yields only are realized at ionic strength values of 0.1 and above.

EXAMPLE XXIII

This Example illustrates the effect of ionic strength of salt solution on process yield.

The process of Example XVIII was repeated using a pH of 6.0 and varius ionic strength values for the salt solution used in the protein extraction step. To simplify procedures, no ultrafiltration was effected. After dilution to an ionic strength below 0.1 and settling of the protein micelles, the yield values for the isolate were determined and are reproduced in the following Table XVI:

TABLE XVI

| Ionic Strength NaCl Solution | Process Yield % |
|---|---|
| 0.2 | 30.0 |
| 0.3 | 39.8 |
| 0.4 | 42.3 |
| 0.5 | 40.8 |
| 0.6 | 40.2 |
| 0.7 | 44.9 |
| 0.8 | 45.3 |
| 0.9 | 44.4 |
| 1.0 | 35.5 |
| 1.3 | 39.9 |
| 1.5 | 40.4 |
| 2.0 | 38.9 |
| 2.5 | 30.3 |
| 3.0 | 24.8 |
| 4.0 | 39.7 |
| 5.0 | 37.7 |

The results of the above Table XVI indicate that as the ionic strength of the extraction solution increases, the quantity protein solubilized increases initially but in the 0.3 to 0.4 range reaches a maximum which is substantially maintained throughout the tested range.

EXAMPLE XXIV

This Example illustrates the functionality and utility of the novel isolate.

(a) Dispersibility

Protein dispersions were formulated using 20% w/w protein isolate in distilled water or 0.2 M sodium chloride solution at various pH values. Those dispersions were formed from a soy PMM isolate formed by the procedure of Example XVIII and three commercial soy protein isolates formed by isoelectric precipitation, namely, two Promine D samples and Supro 620. (the Promine D samples are products of Central Soya while Supro 620 is a product of Ralston Purina).

An important property in preparing protein formulations is that the dispersions be not excessively viscous, so that they can readily be handled or pH adjusted.

The Supro 620 dispersions were extremely viscous, making stirring and pH adjustment practically impossible. Both Promine D's gave slightly less viscosity but dispersion was difficult to achieve and hence pH adjustment was difficult.

While the soy PMM dispersions were fairly viscous, they were much better than any of the others and were easier to adjust pH and to pour.

(b) Gelation Potential

The various protein dispersions made from Promine D and soy PMM and those made from Supro 620 which could be poured were poured into tubes which were sealed and immersed into a 100° C. water bath for 45 minutes. This treatment effects heat gelation of the protein to give a gel similar to boiled egg white. After cooling the heat set gels were tested on a "GF Texturometer" for hardness and cohesiveness, higher numbers being generally preferable in the range of values observed.

The results obtained are reproduced in the following Tables XVII and XVIII, which show, respectively, the results for the dispersions in distilled water and the results for the dispersions in 0.2 M NaCl solution. The GF Texturometer and its operations are described in detail in an article entitled "The Texturometer-A New Instrument for Objective Texture Measurement" by H. H. Friedman et al published in J. of Food Sciences, Vol. 28, p. 390 (1963).

TABLE XVII

| pH | Hardness Value | | | Cohesiveness | | |
|---|---|---|---|---|---|---|
| | Promine D | Supro 620 | Soy PMM | Promine D | Supro 620 | Soy PMM |
| 4.5 | 1.5 | — | 7.5 | 0.36 | — | 0.50 |
| 5.0 | 1.9 | — | 6.0 | 0.45 | — | 0.55 |
| 5.5 | 3.7 | — | 3.8[1] | 0.47 | — | 0.55 |
| 6.0 | 9.6 | — | 4.0[1] | 0.49 | — | 0.58 |
| 6.5 | 12.9 | — | 21.3 | 0.77 | — | 0.87 |
| 7.0 | 7.5 | 2.2 | 11.1 | 0.90 | 0.90 | 0.89 |

Note:
[1]These PMM results appear to be anomalous

TABLE XVIII

| pH | Hardness Value | | | Cohesiveness | | |
|---|---|---|---|---|---|---|
| | Promine D | Supro 620 | Soy PMM | Promine D | Supro 620 | Soy PMM |
| 4.5 | (1) | — | 18.0 | (1) | — | 0.57 |
| 5.0 | 2.4 | — | 12.3 | 0.45 | — | 0.56 |
| 6.0 | 12.2 | — | 32.8 | 0.52 | — | 0.80 |
| 6.5 | 16.3 | — | 33.0 | 0.81 | — | 0.80 |
| 7.0 | 14.7 | 8.0 | 15.6 | 0.78 | 0.87 | 0.93 |

Note:
(1)The The gel was too soft to measure

The results of the above Tables XVII and XVIII demonstrate the superior gelation characteristics of the soy PMM isolate as compared to the commercial soy isoelectric isolates.

(c) Emulsification

Emulsions of protein, oil and water were prepared in accordance with the formulation for the lean phase of a bacon analog as described in U.S. Pat. No. 3,840,677 using various proteins. The protein material functions as an emulsifier and as the heat gelling component.

Viscosities of the emulsions, prior to heat treatment, were determined and the results are outlined in the following Table XIX:

TABLE XIX

| Protein | Viscosity (Brookfield Units)[2] |
|---|---|
| Egg white | 23 |
| Egg white/Promine D/ lactalbumin (50/40/10) | 98[1] |
| Egg white/pea PMM/ lactalbumin (50/40/10) | 21 |

Note:
[1]This emulsion was almost unworkable
[2]As determined at 25° C. on a Brookfield Viscometer model HAT using Spindle no. 2 at 100 rpm.

The results of the above Table XIX show that much lower emulsion viscosities are attained when PMM is substituted for a commercial soy isolate in the protein combination. The emulsions produced using the egg white alone and the egg white, pea PMM and lactalbumin combination were easy to work with.

Further emulsions of the same formulation were formed using 50/50 combinations of egg white/Promine D and egg white/pea PMM and heat set. Hardness values of 35.1 and 41.9 respectively were measured, indicating that the PMM containing material would be more readily sliceable and more chewable.

(d) Protein Fibre Formation

Wet PMM's formed by the procedure of Example I from fababean, field peas, oats and soy beans were formed into fibres in the following manner. The wet PMM was loaded into a cylinder provided with a piston-type plunger for forcing the wet PMM through small orifices at the end of the cylinder. Several experiments were conducted using platinum dies having openings of 0.1 mm and 0.4 mm and stainless steel screens having openings of 0.6 mm.

The individual protein strands were injected into hot tap water having a temperature above about 90° C. and a pH of 7.1. The strands heat coagulated into thin threads and the threads were collected on a screen and removed from the water bath after a heat exposure of about ½ to 1 minute.

In each case the fibres were white to tan in colour and rubbery, and the bite resistance and chewiness increased with increasing bath temperature.

The fibres were used as a satisfactory replacement for all or part of the natural source protein in a variety of food products, including a seafood analog, a meatless breakfast sausage, a chicken consomme, a stove-top chicken-like casserole and a bacon analog.

(e) Protein Beverage

About 0.1% by weight of a mixture containing equal parts by weight of sodium hexametaphosphate and tetrasodium pyrophosphate was uniformly mixed with wet peanut PMM formed by the procedure of Example I. The resulting mixture was spray dried to a powder. Various quantities of the buffered dried PMM powder were dispersed by simple stirring in water and the stability of the resulting aqueous dispersion tested. The stability was tested by allowing samples to stand at refrigeration temperature (about 5° to 10° C.) for about 24 hours, and by subjecting samples at room temperature (about 20° to 25° C.) to centrifugation at 200Xg. The sediment volume was measured for each sample and the observed total sediment volume in all cases of less than 1% was considered indicative of a stable product.

Dispersions were formed at concentrations of buffered PMM of 4%, 8%, 12% and 18% w/v and each was found to be stable. The pH was about 7.1 in each case and the compositions were found to have an acceptable taste by a panel of tasters and did not exhibit any of the adverse taste characteristics of soy-based products.

The viscosity was tested for each concentration and compared with cow's milk and water. The test results are reproduced in the following Table XX:

TABLE XX

| Product Tested | Viscosity (Brookfield Units (25° C.)* |
|---|---|
| 4% PMM | 1.5 |
| 8% PMM | 1.8 |
| 12% PMM | 2.0 |
| 18% PMM | 3.0 |
| Cow's milk (2% protein) | 2.5 |
| Water | 1.4 |

*As determined on a Brookfield Viscometer Model HAT using Spindle No. 2 at 100 rpm.

It will be seen from the viscosity data of Table XX that stable dispersions of relatively high protein concentrations can be achieved (in excess of 12%) while the viscosity is less than that of cow's milk.

Similar results were observed using PMM's from fababeans, field peas and soybeans.

(f) Bread and other baked products

The following recipe for white bread was chosen:
½ cup milk
3 tbsps. sugar
2 tsps. salt
3 tbsps. margarine
1½ cups warm water
1 pkg. active dry yeast
6¼ cups flour Two batches were run, one using sifted all-purpose wheat flour and the other using pea PMM flour consisting of 15 wt % dry pea PMM and 85 wt % cornstarch. Bread was baked from each recipe and the properties compared. The PMM product was similar in properties to the wheat-based product.

Bread was baked from a further batch in which soy PMM flour at the same ratio was substituted for the pea PMM flour. The bread has very similar properties to the wheat-based product and the characteristic soy taste was absent.

PMM products, derived from various plant proteins using the procedure of Example I were also used as a partial or complete substitute for wheat flour in a variety of other normally wheat-based products and products similar in character, properties and taste to the conventional wheat flour product were obtained. Products included break rolls, oatmeal cookies, noodles and chocolate cake.

(g) Egg white substitute

Dry PMM products derived from various plant proteins using the procedure of Example I were used as a partial or complete replacement for egg white in a variety of food compositions in which egg white is conventionally used as a binder. In each case, the cooked product was substantially the same in taste and texture to the same product formed using egg white. Products tested were cake mixes, muffin mixes, pancake mixes, a meat loaf analog and a bacon analog.

SUMMARY OF DISCLOSURE

In summary of this disclosure, the present invention provides a novel protein isolate product having excellent nutritional characteristics as well as high functionality and wide utility. Modifications are possible within the scope of the invention.

What we claim is:

1. A substantially undenatured protein isolate product containing at least about 90% by weight of protein (as determined by Kjeldahl nitrogen×6.25) and in the form of an amorphous protein mass which is formed by settling the solid phase from an aqueous dispersion of protein micelles consisting of homogeneous amphiphilic protein moieties and formed from at least one plant protein source material, said product having substantially no lipid content, substantially no lysinoalanine content and substantially the same lysine content as the storage protein in the source material.

2. The product of claim 1 in dry powder form produced by drying said amorphous protein mass.

3. The product of claim 1 wherein said plant protein source material is selected from the group consisting of cereals, legumes and oil seeds.

4. The product of claim 2 wherein said protein source material is selected from the group consisting of cereals, legumes and oil seeds.

5. The product of claim 1 containing at least about 95% by weight of protein.

6. the product of claim 1, 2, 3 or 4 wherein said aqueous dispersion of plant protein micelles is formed by solubilizing the protein in said at least one protein source material at a temperature of about 15° to 35° C. using a food grade salt solution having a concentration of at least 0.2 ionic strength and a pH of 5.5 to 6.3 to form a protein solution, and diluting the protein solution to an ionic strength of less than 0.1 to cause formation of said dispersion.

7. The product of claim 1, 2, 3 or 4 wherein said aqueous dispersion of protein micelles is formed by solubilizing the plant protein in said at least one protein source material at a temperature of about 15° to about 35° C. using a food grade salt solution having a concentration of at least 0.2 ionic strength and a pH of about 5 to about 6.8 to form a protein solution, increasing the protein concentration of said protein solution while maintaining the ionic strength thereof substantially constant, and diluting the concentrated protein solution to an ionic strength below about 0.2 to cause formation of said dispersion.

8. The product of claim 7 wherein said food grade salt solution has an ionic strength of about 0.2 to about 0.8 and a pH of about 5.3 to about 6.2, said protein concentration step is effected by a membrane technique at a volume reduction factor of about 1.1 to about 6.0, as determined by the ratio of volume of protein solution and the volume of concentrated protein solution, and the dilution of the concentrated protein solution is effected by passing the concentrated protein solution into a body of water having a temperature below about 25° C. and a volume sufficient to decrease the ionic strength of the concentrated protein solution to a value of about 0.06 to about 0.12.

9. The production of claim 7 wherein said food grade salt solution has a pH of about 5 to about 5.5 and the phosphorus content of said protein solution is decreased prior to said dilution step.

10. A plant protein micelle consisting of a homogeneous amphiphilic protein moiety.

11. The micelle of claim 10 derived from plant protein source material selected from the group consisting of cereals, legumes and oil seeds.

* * * * *